(12) United States Patent
Yang et al.

(10) Patent No.: US 10,589,940 B2
(45) Date of Patent: Mar. 17, 2020

(54) POWER WHEEL AND COOPERATIVE CARRYING METHOD THEREOF

(71) Applicant: Metal Industries Research & Development Centre, Kaohsiung (TW)

(72) Inventors: Kuang-Shine Yang, Tainan (TW); Ping-Hua Su, Kaohsiung (TW); Cheng-Yu Lu, Kaohsiung (TW); Chiu-Feng Lin, Pingtung County (TW); Ying-Cherng Lu, Kaohsiung (TW); Pao-Hsien Hsieh, Kaohsiung (TW); Chia-Lung Huang, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 288 days.

(21) Appl. No.: 15/831,397

(22) Filed: Dec. 5, 2017

(65) Prior Publication Data
US 2019/0168971 A1   Jun. 6, 2019

(51) Int. Cl.
*B65G 43/10* (2006.01)
*G05D 1/02* (2020.01)
(Continued)

(52) U.S. Cl.
CPC ........... *B65G 43/10* (2013.01); *B62D 63/025* (2013.01); *B65G 35/00* (2013.01); *G05D 1/0231* (2013.01);
(Continued)

(58) Field of Classification Search
CPC .... B65G 43/10; B65G 35/00; B65G 2207/34; B65G 2201/02; B65G 2203/044;
(Continued)

(56) References Cited

U.S. PATENT DOCUMENTS 7,747,349 B2 *  6/2010  Yeh .......................... B25J 5/007
                                                              180/20
8,430,192 B2 *  4/2013  Gillett ...................... B60K 1/04
                                                              180/65.51
(Continued)

FOREIGN PATENT DOCUMENTS

CN     202542387     11/2012
CN     104443108     3/2015
(Continued)

OTHER PUBLICATIONS

Office Action of Taiwan Counterpart Application, dated Jul. 2, 2018, pp. 1-3.

*Primary Examiner* — Jaime Figueroa
(74) *Attorney, Agent, or Firm* — JCIPRNET

(57) ABSTRACT

A power wheel including a positioning device, a wireless communication module, and a controller is provided, where the controller is configured to operate in an active mode or a passive mode. When operating in the passive mode, the controller is configured to: acquire route information and moving information from the power wheel operating in the active mode by the wireless communication module, and acquire relative position information with the other power wheels by the positioning device; and determine a rotation strategy of the power wheel according to the route information, the moving information and the relative position information. When operating in the active mode, the controller is configured to: acquire the route information, and transmit the route information to the other power wheels; and determine the rotation strategy of the power wheel according to the route information. In addition, a cooperative carrying method of the power wheel is also provided.

10 Claims, 4 Drawing Sheets

(51) Int. Cl.
*B62D 63/02* (2006.01)
*B65G 35/00* (2006.01)

(52) U.S. Cl.
CPC ......... *G05D 1/0278* (2013.01); *G05D 1/0287* (2013.01); *G05D 1/0293* (2013.01); *B65G 2201/02* (2013.01); *B65G 2203/044* (2013.01); *B65G 2207/34* (2013.01); *G05D 2201/0216* (2013.01)

(58) Field of Classification Search
CPC .. G05D 1/0293; G05D 1/0231; G05D 1/0278; G05D 1/0287; G05D 2201/0216; B62D 63/025
USPC ......................................................... 701/23
See application file for complete search history.

(56) References Cited

U.S. PATENT DOCUMENTS

| | | | | |
|---|---|---|---|---|
| 8,459,383 | B1* | 6/2013 | Burget | B60B 19/003 180/7.1 |
| 9,174,338 | B2* | 11/2015 | Ouellet | B25J 5/007 |
| 9,586,471 | B2* | 3/2017 | Gillett | B60K 7/0007 |
| 9,663,106 | B1* | 5/2017 | Almutairi | B60K 7/0007 |
| 9,833,901 | B2* | 12/2017 | Perrone | B25J 9/1661 |
| 10,168,701 | B2* | 1/2019 | Berberian | G05D 1/0038 |
| 10,308,134 | B2* | 6/2019 | Fontaine | C08C 19/20 |
| 2004/0124307 | A1* | 7/2004 | Mackness | B60C 23/0408 244/10 |
| 2004/0200645 | A1* | 10/2004 | Koors | B62D 57/00 180/7.1 |
| 2007/0150096 | A1* | 6/2007 | Yeh | B25J 5/007 700/245 |
| 2007/0150111 | A1* | 6/2007 | Wu | G01S 17/58 700/258 |
| 2009/0188729 | A1* | 7/2009 | Berry | B60B 19/14 180/7.1 |
| 2010/0270850 | A1* | 10/2010 | Brudniok | B60B 19/003 301/5.23 |
| 2011/0162896 | A1* | 7/2011 | Gillett | B60K 1/04 180/2.2 |
| 2012/0273284 | A1* | 11/2012 | Nesnas | B25J 5/007 180/7.5 |
| 2014/0318879 | A1* | 10/2014 | Gillett | B60K 7/0007 180/167 |
| 2017/0106738 | A1* | 4/2017 | Gillett | B60K 7/0007 |
| 2018/0222528 | A1* | 8/2018 | Jagenstedt | A01D 34/008 |

FOREIGN PATENT DOCUMENTS

| | | |
|---|---|---|
| CN | 105292971 | 2/2016 |
| CN | 106185698 | 12/2016 |
| CN | 205923241 | 2/2017 |
| CN | 205972607 | 2/2017 |
| CN | 206427739 | 8/2017 |
| TW | 206574 | 5/1993 |
| WO | 2017193802 | 11/2017 |

* cited by examiner

POWER WHEEL AND COOPERATIVE CARRYING METHOD THEREOF

BACKGROUND OF THE DISCLOSURE

1. Field of the Disclosure

The present disclosure relates to a carrying device, and more particularly, relates to a modular power wheel and a cooperative carrying method thereof.

2. Description of Related Art

In the technical field of automatic control, there are increasing more developments and studies regarding auto guided vehicles (AGV) being proposed. However, in a carrying operation of the conventional auto guided vehicle, volume and shape of an object to be carried are decided based on weight and size of the auto guided vehicle. In other words, the conventional auto guided vehicle is unable to carry the object to be carried with a special shape. Accordingly, how to design a mechanism so the carrying operation of the auto guided vehicle can be more flexible is one of important issues to be addressed in the field.

SUMMARY OF THE DISCLOSURE

The present disclosure is directed to a power wheel and a cooperative carrying method thereof, which are capable of adapting an object to be carried in any shape and carrying the same so a high flexibility can be provided.

The power wheel according to the embodiments of the disclosure is configured for cooperatively carrying an object with a plurality of other power wheels. Each of said power wheels includes a positioning device, a wireless communication module and a controller. The controller is coupled to the positioning device and the wireless communication module, and configured to operate in one of an active mode and a passive mode. When operating in the passive mode, the controller is configured to: acquire route information and moving information from the power wheel operating in the active mode by the wireless communication module, and acquire relative position information with the other power wheels by the positioning device; and determine a rotation strategy according to the route information, the moving information and the relative position information. When operating in the active mode, the controller is configured to: acquire the route information, and transmit the route information to the other power wheels; and determine the rotation strategy of the power wheel according to the route information.

In an embodiment of the disclosure, when operating in the active mode, the controller is further configured to: generate the moving information according to the rotation strategy of the power wheel; and transmit the moving information to the power wheels operating in the passive mode.

In an embodiment of the disclosure, the rotation strategy includes a rotation speed and a rotation orientation.

In an embodiment of the disclosure, each of said power wheels includes a securing device, configured to secure the carried object.

In an embodiment of the disclosure, each of the power wheels includes an identification tag and an image sensing device. The identification tag is disposed on a lateral side of each of said power wheels. The image sensing device is coupled to the controller, and configured to capture the identification tags of the other power wheels so as to identify the other power wheels.

In an embodiment of the disclosure, the positioning device is an optical distance measuring device.

In an embodiment of the disclosure, the positioning device is a global positioning system module.

The cooperative carrying method according to the embodiments of the disclosure is adapted to a plurality of power wheels to cooperatively carry an object. A first power wheel among the power wheels operates in an active mode, and a plurality of second power wheels among the power wheels operate in a passive mode. The cooperative carrying method includes: acquiring route information and transmitting the route information to the second power wheels by the first power wheel; respectively acquiring relative position information with the other power wheels by the second power wheels; determining a rotation strategy of the first power wheel according to the route information by the first power wheel; generating moving information according to the rotation strategy of the first power wheel and transmitting the moving information to the second power wheels by the first power wheel; and respectively receiving the route information and the moving information and determining a rotation strategy for each of the second power wheels according to the route information, the moving information and the relative position information by the second power wheels.

In an embodiment of the disclosure, the step of respectively acquiring the relative position information with the other power wheels by the second power wheels includes: identifying the other power wheels through identification tags of the first power wheel and the second power wheels by the second power wheels; and respectively acquiring the relative position information with the other power wheels by the second power wheels using optical distance measuring devices.

In an embodiment of the disclosure, the rotation strategy includes a rotation speed and a rotation orientation.

Based on the above, the power wheel and the cooperative carrying method thereof as proposed by the embodiments of the disclosure are capable of determining the rotation strategy by communicating with the other power wheels through various devices including the controllers, the positioning devices and the wireless communication modules disposed on the power wheels. As a result, the convenience in use may be improved and the object in any shape may be carried without suffering space limitations.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
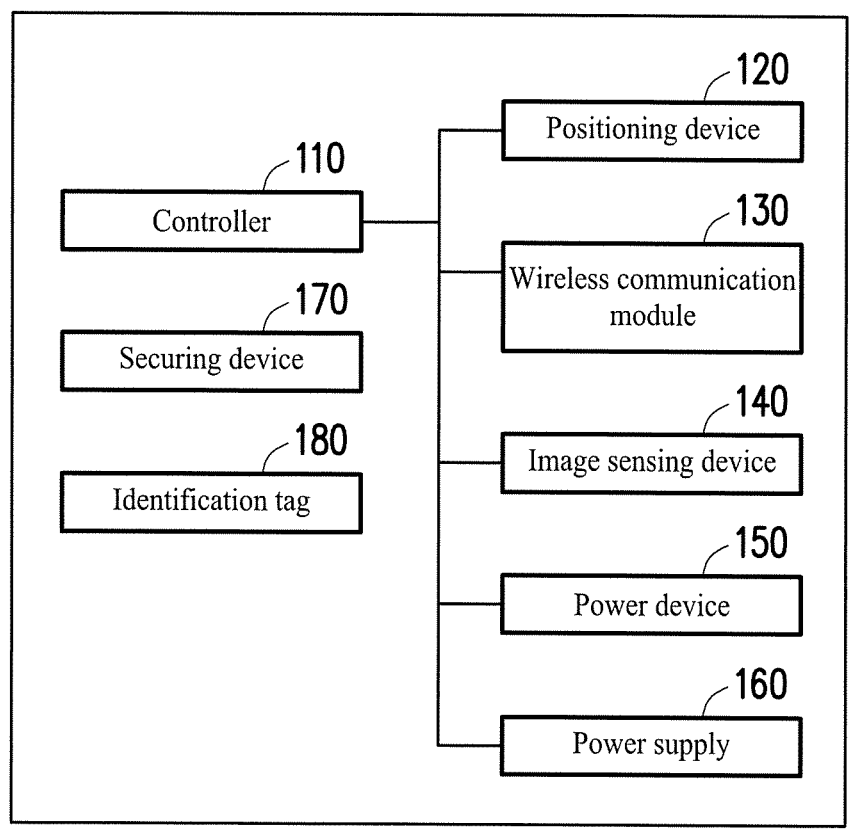
FIG. 1A illustrates a schematic block diagram of a power wheel in an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." Moreover, elements/components/steps with same reference numerals represent same or similar parts in the drawings and embodiments. Elements/components/steps with the same reference numerals or names in different embodiments may be cross-referenced.

Figure 1B:
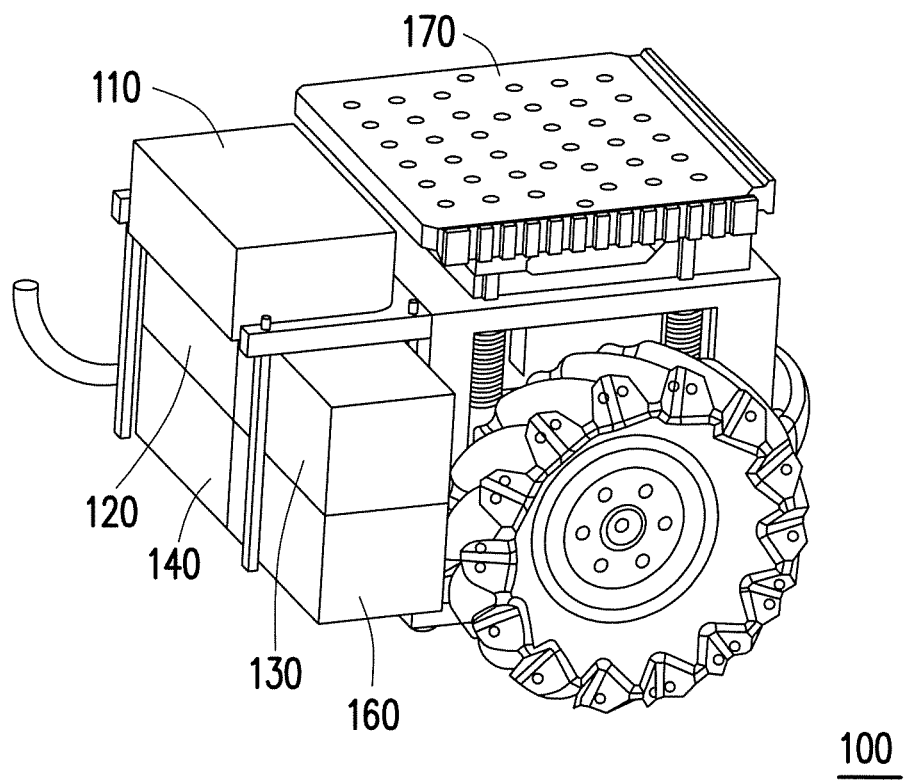
FIG. 1B illustrates a schematic view of the power wheel from a first perspective in an embodiment of the disclosure.
Figure 1C:
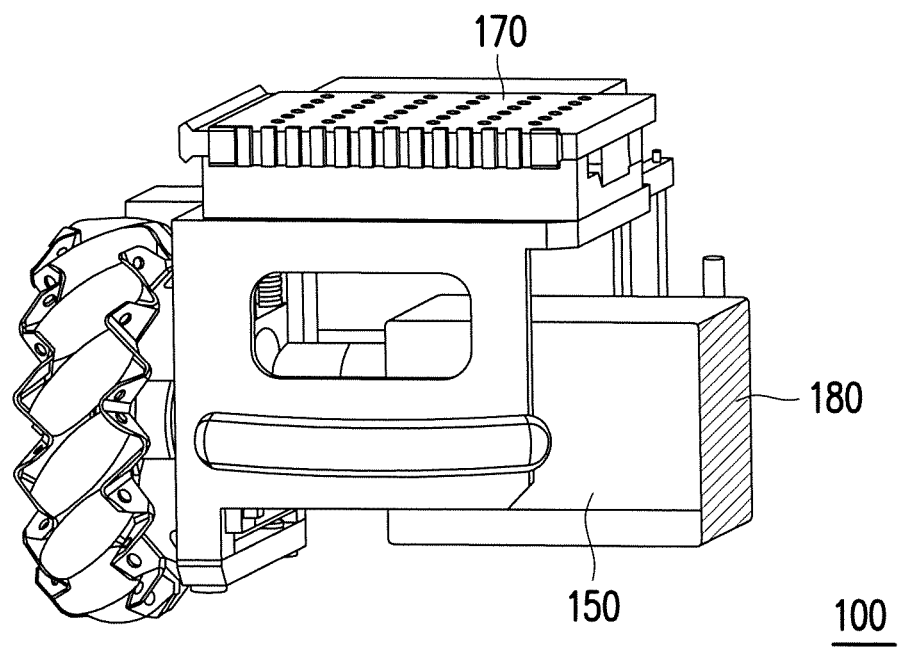
FIG. 1C illustrates a schematic view of the power wheel from a second perspective in an embodiment of the disclosure.

FIG. 1A illustrates a schematic block diagram of a power wheel in an embodiment of the disclosure; FIG. 1B illustrates a schematic view of the power wheel from a first perspective in an embodiment of the disclosure; FIG. 1C illustrates a schematic view of the power wheel from a second perspective in an embodiment of the disclosure.

Referring to FIG. 1A, FIG. 1B and FIG. 1C together, a power wheel 100 of the present embodiment includes a controller 110, a positioning device 120, a wireless communication module 130, an image sensing device 140, a power device 150 and a power supply 160. Among them, the controller 110 is coupled to the positioning device 120, the wireless communication module 130, the image sensing device 140, the power device 150 and the power supply 160. In addition, the power wheel 100 of the present embodiment further includes a securing device 170 and an identification tag 180.

In the present embodiment, a plurality of the power wheels 100 are implemented by, for example, a tire mechanism capable of moving in any direction on a plane without changing postures, such as an omnidirectional wheel. With such configuration, when commonly performing the cooperative carrying method according to the embodiments of the disclosure, the power wheels 100 can stably carry an object based on a specific requirement (e.g., without rotating the carried object) can be cooperatively satisfied. Nonetheless, the disclosure is not limited to the specific requirement described above. In other embodiments, the specific requirement may also be, for example, rotating the carried object in a specific way to overcome limitations from terrains or routes.

In the present embodiment, the controller 110 operates in an active mode or a passive mode to handle overall operation of the power wheel 100, and may include, for example, a central processing unit (CPU) composed of single-core or multi-core, or other programmable devices for general purpose or special purpose, such as a microprocessor and a digital signal processor (DSP), a programmable controller, an application specific integrated circuit (ASIC), a programmable logic device (PLD) or other similar devices or a combination of above-mentioned devices. In particular, in the embodiments of the disclosure, each one of the power wheels 100 is disposed with one controller 110 for controlling operations of the power wheel 100. Accordingly, while the power wheels 100 are cooperatively carrying the object, each of the power wheels 100 can cooperatively operate with different rotation speeds and rotation orientations according to a rotation strategy determined by the corresponding controller 110. Operations regarding the controller 110 in the active mode and the passive mode will be described in details in the following paragraphs.

In an embodiment, the positioning device 120 is, for example, an optical distance measuring device which includes a laser transceiving module capable of acquiring distance data within a field of view (FOV). For instance, the field of view of the optical distance measuring device contains the other power wheels 100, for example. The laser transceiving module emits a laser pulse, and then the laser pulse is reflected after hitting an object surface so the laser transceiving module can receive the reflected laser pulse. A time difference between emission and reception time points of the laser pulse may correspond to a time-of-flight (TOF). Accordingly, distances from the laser transceiving module to the other power wheels may be calculated based on the time-of-flight of photon together with light speed. Nonetheless, specific implementation of the optical distance measuring device and a data format of acquired original data are not particularly limited in the disclosure. In other embodiments, the optical distance measuring device may also acquire the distance data within the field of view by using a structured light or other approaches, for example. Persons with ordinary skill in the art can decide the optical distance measuring device for acquiring the distance data based on demand. After acquiring the distance data between the power wheel 100 and the other power wheels, relative position information of the power wheel 100 with the other power wheels may then be acquired.

In another embodiment, the positioning device 120 is, for example, a global positioning system (GPS) module, which acquires positioning information of the power wheel 100 through a global positioning system. In other embodiments, the positioning device 120 may also acquire the positioning information of the power wheel 100 by methods including a 3G network positioning, a WiFi network positioning or an IP address positioning, for example. By sharing the respective positioning information among the power wheels 100, the relative position information of the power wheels 100 may be acquired.

In the present embodiment, the wireless communication module 130 is configured to communicate with the other power wheels 100, and support various wireless communication standards, such as Bluetooth, WiFi, worldwide interoperability for microwave access (WiMax), near field communication (NFC) and long term evolution (LTE), for example. In an embodiment, when the controller 110 operates in the active mode, the wireless communication module 130 may further be used to communicate with an external device, so as to acquire route information from the external device.

In the present embodiment, the image sensing device 140 is configured to capture images of the identification tags 180 on the other power wheels. The controller 110 can identify the other power wheels participated in cooperatively carrying the object according to the images acquired by the image sensing device 140, and can determine the relative position information of its own with the other power wheels by using the data acquired by the positioning device 120. The image sensing device 140 is, for example, a charge coupled device (CCD) image sensor or a complementary metal-oxide semiconductor (CMOS) image sensor or other similar image sensors, which are not particularly limited in the disclosure.

In the present embodiment, the power device 150 (which is, for example, a power motor system, but not limited thereto) is controlled by the controller 110 to provide a rotation power for the power wheel 100 and control the rotation orientation according to the rotation strategy determined by the controller 110. Specifically, when the power provided by the power device 150 is greater, the rotation speed rotatable by the power device 100 is faster or a rotational torsion is greater. As the rotational torsion is greater, a loading capability of the power wheel 100 is stronger. In the present embodiment, the rotation strategy includes the rotation speed and the rotation orientation of the power wheel 100, but not limited thereto.

In the present embodiment, the power supply 160 is configured to provide an electrical power required by the power wheel 100, and may be, for example, a lithium battery, a lithium ion battery or an alkali battery, which are not particularly limited in the disclosure. In particular, each of the modular power wheels 100 is disposed with the power supply 160 in the present embodiment to further improve the flexibility in use.

In the present embodiment, the securing device 170 is configured to secure the carried object, and may be a carrying platform or a locking device (e.g., a screw, a bolt, etc.), which are not particularly limited in the disclosure.

In the present embodiment, the identification tag 180 is disposed on a lateral side of the power wheel 100, and may include, for example, one of serial number information, rotation strategy information and an operating mode of the power wheel 100 or a combination of the above information, which are not particularly limited in the disclosure. It is noted that, for allowing the identification tag 180 to be contained within the field of views of the image sensing devices 140 of the other power wheels 100 as much as possible, the power wheel 100 may also include identical copies of the identification tag 180, which are disposed on multiple lateral sides of the power wheel 100.

With cooperation of the power wheels 100 in the foregoing embodiment, the object may be stably carried without rotating on the plane regardless of what the shape or the weight distribution may be. The cooperative carrying method according to the embodiments of the disclosure is described below with reference to examples.

Figure 2:
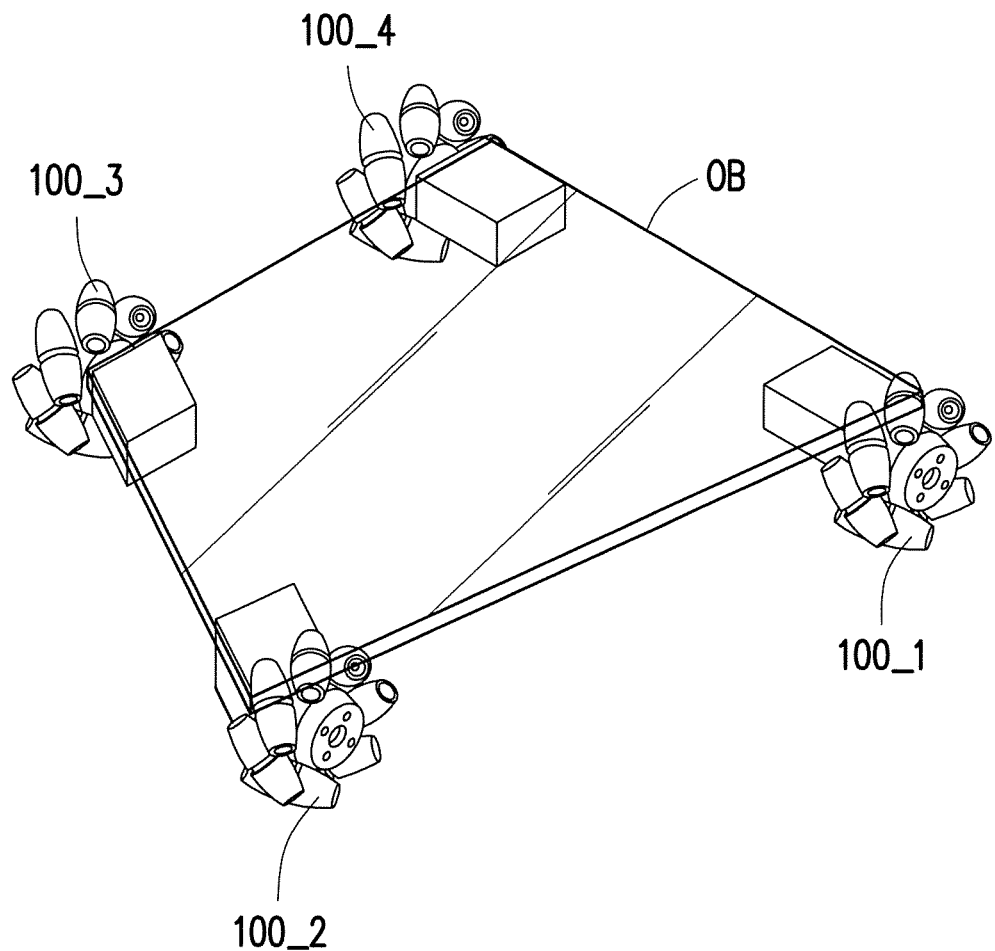
FIG. 2 illustrates a schematic diagram for cooperatively carrying an object in an embodiment of the disclosure.

FIG. 2 illustrates a schematic diagram for cooperatively carrying an object in an embodiment of the disclosure.

With reference to FIG. 2, an object OB to be carried is cooperatively carried by a plurality of power wheels 100, and the power wheels 100 include a power wheel 100_1, a power wheel 100_2, a power wheel 100_3 and a power wheel 100_4. In the present embodiment, four corners of the object OB are secured through the securing devices 170 on the four power wheels 100_1, 100_2, 100_3 and 100_4. In particular, the object OB is an irregular tetragon such that a distance between any two among the four power wheels 100_1, 100_2, 100_3 and 100_4 and their disposed directions are different from each other.

In the present embodiment, once the object OB are secured on the four power wheels 100_1, 100_2, 100_3 and 100_4, the identification tag 180 of each of the power wheels is disposed facing inwardly so the identification tag 180 can be contained within the field of views of the image sensing devices 140 of the other power wheels. For instance, the power wheel 100_1 can identify the power wheels 100_2, 100_3 and 100_4 cooperatively carrying the object OB through the identification tags 180 of the power wheels 100_2, 100_3 and 100_4.

In the present embodiment, the power wheel 100_1 serves as a leading power wheel, whereas each of the power wheels 100_2, 100_3 and 100_4 serves as an auxiliary power wheel. The leading power wheel operates in the active mode. The leading power wheel 100_1 operating in the active mode acquires route information and determines a carrying direction and a carrying speed for the object OB according to the route information. On the other hand, the auxiliary power wheel operates in the passive mode for carrying the object in cooperation with the leading power wheel without rotating object OB.

In an embodiment, the route information is, for example, a predetermined route for the object OB form an external device (not shown). After connecting to the external device and receiving the route information, the leading power wheel 100_1 then determines its rotation strategy according to the route information (e.g., a rotation orientation and a rotation speed). Moreover, the leading power wheel 100_1 also transmits the route information to the auxiliary power wheels 100_2, 100_3 and 100_4. In this way, the auxiliary power wheels 100_2, 100_3 and 100_4 can also determine their rotation strategies according to the route information.

In another embodiment, the route information may also be remote control information from the external device. The external device can communicate with the leading power wheel 100_1 in real time, and can directly transfer route information (e.g., turning left or turning right) to the leading power wheel 100_1 in order to control the rotation strategy of the leading power 100_1. Similarly, the leading power wheel 100_1 transmits the received route information to the auxiliary power wheels 100_2, 100_3 and 100_4.

In still another embodiment, the leading power wheel 100_1 further includes a laser scanner coupled to the controller 110, for example. The laser scanner is configured to scan spatial environmental information surrounding the leading power wheel 100_1, such that the controller 110 of the leading power wheel 100_1 can plan and obtain the route information according to the spatial environmental information.

However, the disclosure is not limited thereto. In other embodiments, the route information may also be pre-loaded in the leading power wheel 100_1, or the route information may be acquired by the leading power wheel 100_1 through other approaches.

After determining the rotation strategy according to the route information, the leading power wheel 100_1 can convert the rotation strategy into moving information, and transmit the moving information to the other auxiliary power wheels 100_2, 100_3 and 100_4. For instance, the leading power wheel 100_1 can transmit the rotation orientation and the rotation speed of its own to the auxiliary power wheels 100_2, 100_3 and 100_4 by the wireless communication module 130.

Other than receiving the route information and the moving information from the leading power wheel 100_1, the auxiliary power wheels 100_2, 100_3 and 100_4 operating in the passive mode can also acquire relative position information with the leading power wheel 100_1 and the other auxiliary power wheels. Taking the auxiliary power wheel 100_3 for example, in the present embodiment, the auxiliary power wheel 100_3 uses the image sensing device 140 to identify the power wheels 100_1, 100_2 and 100_4 cooperatively carrying the object OB through the identification tags 180 of the power wheels 100_1, 100_2 and 100_4, and then acquires distances from the auxiliary power wheel 100_3 to the leading power wheel 100_1 and the auxiliary power wheels 100_2 and 100_4 by the positioning device 120 (e.g., the optical distance measuring device).

In another embodiment, the auxiliary power wheel 100_3 may acquire position information obtained by each of the positioning devices 120 (e.g., the GPS module) of the leading power wheel 100_1 and the auxiliary power wheels 100_2 and 100_4 from the leading power wheel 100_1 and the auxiliary power wheels 100_2 and 100_4 by the wireless communication module 130. With the position information, the auxiliary power wheel 100_3 can then calculate the relative position information of its own with the other power wheels 100_1, 100_2 and 100_4.

The rest of the power wheels 100_1, 100_2 and 100_4 may also acquire the relative position information of their own with the other power wheels, and detail regarding the same is not repeated hereinafter.

In an embodiment, the identification tag 180 may be, for example, a display screen or at least one LED light in different colors and types. In another embodiment, the identification tag 180 may indicate serial number information of the respective power wheel, for example. When the moving information is received from the leading power wheel through the wireless communication module 130 by any auxiliary power wheel, the serial number information of the leading power wheel may also be acquired to identify the leading power wheel from the identification tag 180. Further, the auxiliary power wheel may also acquire the serial number information of the other auxiliary power wheels by the wireless communication module 130, so as to identify the other auxiliary power wheel in cooperation. In other words, the present disclosure is not intended to limit the identification tag 180 to be the specific technical means for identifying the power wheels cooperatively carrying the object OB, which may be realized by persons with ordinary skill in the art based on demand.

After the relative position information with the other power wheel are acquired by the auxiliary power wheels 100_2, 100_3 and 100_4, respectively, the rotation strategies of the auxiliary power wheels 100_2, 100_3 and 100_4 may be determined according to the route information, the moving information and the relative position information with the other power wheels as acquired from the leading power wheel 100_1. For example, the rotation speed and the rotation orientation of each of the auxiliary power wheels 100_2, 100_3 and 100_4 may be determined. In this way, after the rotation speed and the rotation orientation of each of the power wheels 100_1, 100_2, 100_3 and 100_4 are determined, the object OB may then be cooperatively carried without rotating the object OB.

It is noted that, when the carried object OB is an irregular shape, weights bearing by the power wheels may be different from each other. When the weights of some parts of the object OB are too heavy so at least one of the power wheels 100_1, 100_2, 100_3 and 100_4 is overloading, users may, for example, have additional power wheels securing the object OB (e.g., by adding new auxiliary power wheels between the power wheel 100_1 and the power wheel 100_2). In particular, the newly added power wheels can automatically adapt to the existing power wheels 100_1, 100_2, 100_3 and 100_4 to cooperatively carry the object OB through the method according to the embodiment of the disclosure.

Figure 3:
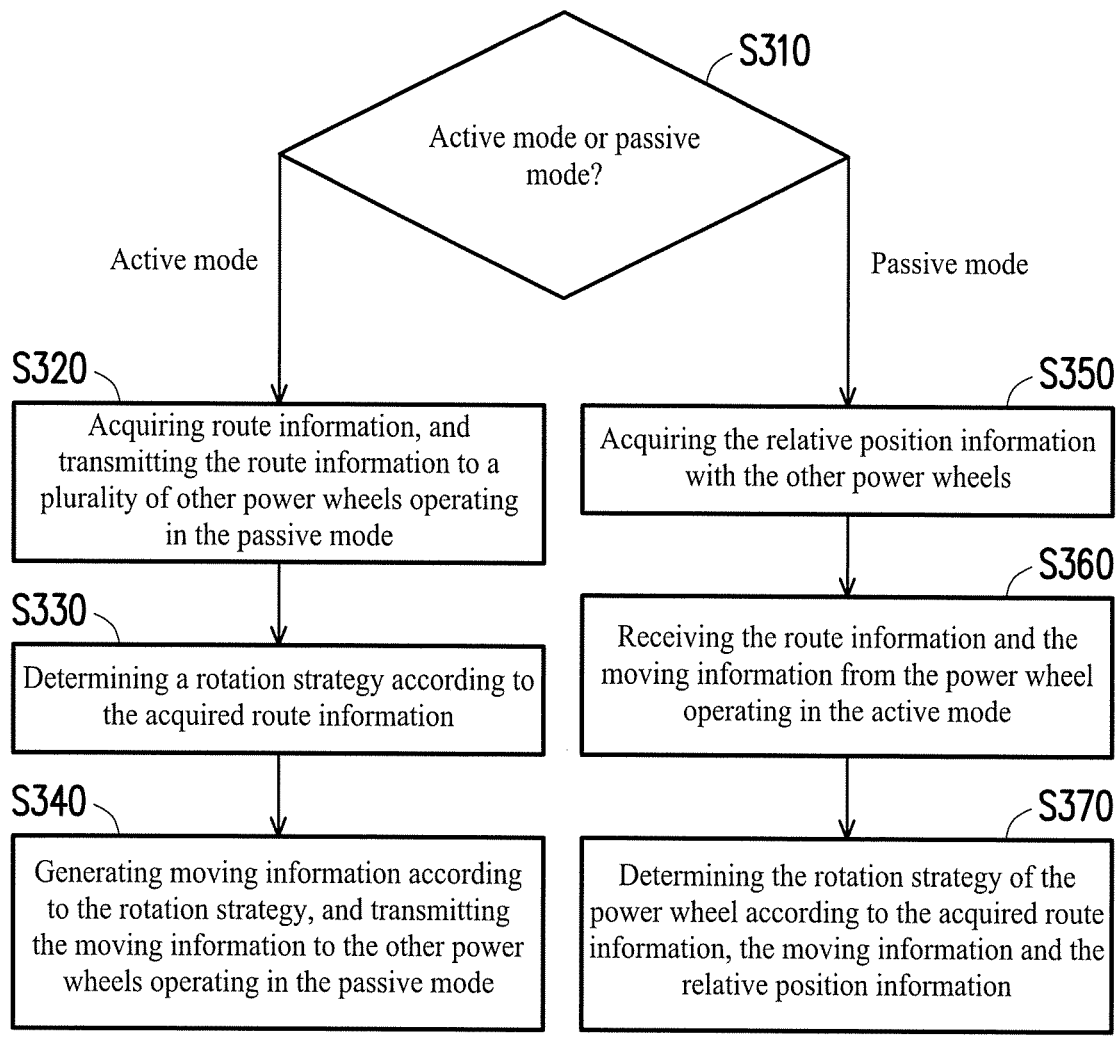
FIG. 3 illustrates a flowchart for cooperatively carrying an object in an embodiment of the disclosure.

FIG. 3 illustrates a flowchart for cooperatively carrying an object in an embodiment of the disclosure.

With reference to FIG. 3, the cooperative carrying method introduced by the present embodiment is adapted to the power wheels 100 of the foregoing embodiment, and thus the present embodiment is described with reference to the power wheels in the foregoing embodiment. Same reference numbers are used to represent same or similar elements, and repetitive steps are not repeated hereinafter.

In step S310, the controller 110 of the power wheel 100 determines to operate in an active mode or a passive mode. In the present embodiment, for example, the controller 110 may be connected to an external device to receive instructions from the external device, so as to determine whether to operate in the active mode or the passive mode. In another embodiment, a physical button is, for example, disposed on a lateral side of the power wheel 100, and configured to select the operating mode to be the active mode or the passive mode. In yet another embodiment, a plurality of the power wheels 100 communicate with each other by the wireless communication modules 130, and determine one of the power wheels 100 to be operating in the active mode while the rest operate in the passive mode according to information like a position of each of the power wheels 100 relative to the object OB or a remaining power of each of the power wheels 100. In other words, the present disclosure is not intended to limit a selection method for selecting one of the power wheels 100 to operate in the active mode.

If the power wheel 100 operates in the active mode (e.g., the power wheel 100_1), in step S320, the power wheel 100 acquires route information, and transmit the route information to the other power wheels operating in the passive mode (the power wheels 100_2, 100_3 and 100_4). In step S330, the controller 110 of the power wheel 100 determines a rotation strategy of the power wheel 100 according to the acquired route information so the power wheel 100 can operate accordingly. Lastly, in step S340, the power wheel 100 generates moving information according to the rotation strategy, and transmits the moving information to the other power wheels operating in the passive mode (e.g., the power wheels 100_2, 100_3 and 100_4).

If the power wheel 100 operates in the passive mode (e.g., the power wheels 100_2, 100_3 and 100_4), in step S350, the power wheel 100 acquires relative position information with the other power wheels. In an embodiment, the power wheel 100 operating in the passive mode (e.g., the power wheels 100_2, 100_3 and 100_4) first identifies the other power wheels through the identification tags 180 of the other power wheels. Thereafter, the relative position information with the other power wheels may be acquired by using the optical distance measuring device. In another embodiment, the power wheel 100 operating in the passive mode (e.g., the power wheels 100_2, 100_3 and 100_4) acquires position information obtained by the GPS modules of the other power wheels from the other power wheels by the wireless communication module 130 and integrates all of the position information in order to acquire the relative position information with the other power wheels.

In step S360, the power wheel 100 receives the route information and the moving information from the power wheel operating in the active mode (e.g., the power wheel 100_1) by the wireless communication module 130. Lastly, in step S370, the controller 110 of the power wheel 100 determines the rotation strategy of the power wheel 100 according to the acquired route information, the moving information and the relative position information so the power wheel 100 can operate accordingly.

In summary, the power wheel and the cooperative carrying method thereof as proposed by the embodiments of the disclosure are capable of determining the rotation strategy by communicating with the other power wheels through various devices including the controllers, the positioning devices and the wireless communication modules disposed on the power wheels. As a result, the convenience in use may be improved and the object in any shape may be carried without suffering space limitations.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A power wheel, configured to cooperatively carry an object with a plurality of other power wheels, each of said power wheels comprising:
    a positioning device;
    a wireless communication module, configured to communicate with the other power wheels; and
    a controller, coupled to the positioning device and the wireless communication module, and configured to operate in one of an active mode and a passive mode,
    wherein when operating in the passive mode, the controller is configured to:
        acquire route information and moving information from the power wheel operating in the active mode by the wireless communication module, and acquire relative position information with the other power wheels by the positioning device; and
        determine a rotation strategy of the power wheel according to the route information, the moving information and the relative position information,
    wherein when operating in the active mode, the controller is configured to:
        acquire the route information, and transmit the route information and the moving information to the other power wheels; and
        determine the rotation strategy according to the route information.

2. The power wheel according to claim 1, wherein when operating in the active mode, the controller is further configured to:
    generate the moving information according to the rotation strategy of the power wheel; and
    transmit the moving information to the power wheels operating in the passive mode.

3. The power wheel according to claim 1, wherein the rotation strategy comprises a rotation speed and a rotation orientation.

4. The power wheel according to claim 1, wherein each of said power wheels comprises:
    a securing device, configured to secure the carried object.

5. The power wheel according to claim 1, wherein each of said power wheels comprises:
    an identification tag, disposed on a lateral side of each of said power wheels; and
    an image sensing device, coupled to the controller, and configured to capture the identification tags of the other power wheels so as to identify the other power wheels.

6. The power wheel according to claim 1, wherein the positioning device is an optical distance measuring device.

7. The power wheel according to claim 1, wherein the positioning device is a global positioning system module.

8. A cooperative carrying method, applicable to a plurality of power wheels for cooperatively carrying an object, wherein a first power wheel among the power wheels operates in an active mode, a plurality of second power wheels among the power wheels operate in a passive mode, and the cooperative carrying method comprises:
    acquiring route information and transmitting the route information to the second power wheels by the first power wheel;
    respectively acquiring relative position information with the first power wheel and the second power wheels by the second power wheels;
    determining a rotation strategy of the first power wheel according to the route information by the first power wheel;
    generating moving information according to the rotation strategy of the first power wheel and transmitting the moving information to the second power wheels by the first power wheel; and
    respectively receiving the route information and the moving information and determining a rotation strategy for each of the second power wheels according to the route information, the moving information and the relative position information by the second power wheels.

9. The cooperative carrying method according to claim 8, wherein the step of respectively acquiring the relative position information with the first power wheel and the second power wheels by the second power wheels comprises:
    identifying the first power wheel and the second power wheels through identification tags of the first power wheel and the second power wheels by the second power wheels; and
    respectively acquiring the relative position information with the first power wheel and the second power wheels by the second power wheels using optical distance measuring devices.

10. The cooperative carrying method according to claim 8, wherein the rotation strategy comprises a rotation speed and a rotation orientation.

* * * * *